United States Patent [19]
Wakita et al.

[11] Patent Number: 5,347,394
[45] Date of Patent: Sep. 13, 1994

[54] NONLINEAR OPTICAL MATERIALS, METHOD OF MANUFACTURING THE SAME, AND OPTICAL WAVELENGTH CONVERTER

[75] Inventors: Katsuya Wakita, Nara; Tetsuji Kawakami, Katano; Nobuo Sonoda, Settsu; Hisashi Minemoto, Otsu, all of Japan

[73] Assignee: Matsushita Electric Industrial Co., Ltd., Kadoma, Japan

[21] Appl. No.: 43,407

[22] Filed: Apr. 6, 1993

[30] Foreign Application Priority Data

Jun. 5, 1992 [JP]  Japan .................... 4-145351
Dec. 1, 1992 [JP]  Japan .................... 4-321578

[51] Int. Cl.$^5$ .................................. G02F 1/35
[52] U.S. Cl. .................... 359/326; 252/582; 372/21; 385/122; 528/310
[58] Field of Search .................... 359/326–332; 372/21, 22; 385/122, 141, 143, 145; 252/582; 528/310–314, 321, 330, 331, 335–337

[56] References Cited

U.S. PATENT DOCUMENTS

| | | | |
|---|---|---|---|
| 4,943,145 | 7/1990 | Miyata | 359/326 X |
| 4,965,020 | 10/1990 | Allen et al. | 359/328 X |
| 4,983,324 | 1/1991 | Dürr et al. | 359/328 X |
| 5,009,815 | 4/1991 | Wakita et al. | 252/582 |
| 5,037,582 | 8/1991 | Miyata et al. | 359/328 X |
| 5,247,055 | 9/1993 | Stenger-Smith et al. | 528/310 |

FOREIGN PATENT DOCUMENTS

| | | |
|---|---|---|
| 0430142 | 11/1926 | European Pat. Off. |
| 0355326 | 6/1989 | European Pat. Off. |
| 0384364 | 2/1990 | European Pat. Off. |
| 2149825 | 6/1990 | Japan |
| 2-285329 | 11/1990 | Japan |
| 4-70821 | 3/1992 | Japan |

OTHER PUBLICATIONS

K. Wakita et al., "Nonlinear Optical Properties of Dimerized Compounds", Preliminary Abstract Report for Lecture II, Report No. 4 A2 35, p. 549, Published Sep. 11, 1992, by Japan Chemical Society.

Chien-Hui Li et al., "Studies on the Thermotropic Liquid Crystalline Polymer. I. Synthesis and Properties of Polyamide-Azomethine-Ether", Journal of Polymer Science: Part A: Polymer Chemistry, vol. 28, pp. 3625–3638; 1990.

Primary Examiner—John D. Lee
Attorney, Agent, or Firm—Ratner & Prestia

[57] ABSTRACT

The invention provides a nonlinear optical material comprising a compound represented by the general formula (1):

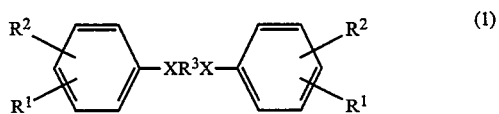

wherein $R^1$ denotes an electron attractive group, $R^2$ denotes a group selected from the group consisting of a hydrogen atom, methyl group, methoxy group and electron attractive group, $R^3$ denotes a straight-chain alkylene group, and X denotes an oxygen or sulfur atom. The invention also relates to a method of manufacturing a nonlinear optical material comprising the steps of dissolving a compound represented by the general formula (1) in an organic solvent, and evaporating the solvent while keeping its temperature constant or lowering its temperature, thereby growing a crystal of the compound represented by the general formula (1). The nonlinear optical material of the invention possessing a molecular structure realized by linking structures having a strong electron attractive group and weak electron donative portion with straight-chain alkylene portions, and thus a nonlinear optical material having a shortened absorption edge wavelength and excellent crystallinity may be obtained. These nonlinear optical materials can be effectively utilized as the nonlinear optical material for an optical wavelength converter.

5 Claims, 2 Drawing Sheets

NONLINEAR OPTICAL MATERIALS, METHOD OF MANUFACTURING THE SAME, AND OPTICAL WAVELENGTH CONVERTER

BACKGROUND OF THE INVENTION

The present invention relates to nonlinear optical materials applicable in various optical wavelength converters, a method of manufacturing the same, and wavelength converters using the same.

As photonics materials useful in future optical devices, materials showing great nonlinear optical effects and responding at high speed are in demand, and widely searched for.

As such materials, as compared with inorganic compound crystals to which the vibration of a crystal lattice is related, organic compounds possessing a $\pi$-electron conjugated system are said to be superior in response and magnitude of threshold of optical damage from intense light such as laser light. As the design principle, it was hitherto effective and routine to introduce a strong electron attractive group and a strong electron donative group in the molecule possessing a $\pi$-electron conjugated system. As organic materials possessing great nonlinear optical effects, nitroaniline derivatives possessing a nitro group and an amine group as substituent groups are generally known. Moreover, nonlinear optical materials possessing an intra-molecular charge transfer structure without an inversion center, while having a large hyperpolarizability $\beta$, have been reported (Japanese Patent Application Laid-open No. Hei. 3-95147). Using these single crystals, it has also been attempted to oscillate a solid laser by semiconductor laser pumping, and to fabricate a wavelength converter for converting the wavelength of the light, for example, as disclosed by Kitaoka, et al., in Extended abstracts 30-Q-13 (the 37th spring meeting, 1990), the Japan Society of Applied Physics and Related Societies, and Y. Goto, et al., Proceeding of SPIE, 1337, 297 (1990).

For excellent nonlinear optical materials at the molecular level, compounds are desired to have a large second order hyperpolarizability $\beta$ those effects appear in a strong electric field of light; and in an assembled form of crystal, it is desired not to possess the inversion center.

However, in order to demonstrate the nonlinear optical characteristics sufficiently, if an attempt is made to enhance the second order hyperpolarizability by introducing a strong electron attractive group and an electron donative group the organic compound possessing a $\pi$-electron conjugated system, the crystallization is difficult. Even if crystals are formed, the crystallization occurs in such a manner as to mutually cancel the intrinsic large dipole moments, and nonlinear optical characteristics are not demonstrated at the crystal level. Moreover, to generate the second order nonlinear optical effect, when a bulky substituent is introduced so that the crystal may not possess a center of symmetry, although large nonlinear optical characteristics are exhibited in the powdered micro crystal state, it could not be used as wavelength converter because large crystals were not obtained.

As an other problem of such compounds, they are unstable thermally because the melting point is low, or vapor pressure is high and the sublimation property is high. Yet, by introducing a strong electron attractive group and an electron donative group in order to obtain large nonlinear optical characteristics, the absorption spectrum of the compound is extended to the longer wavelength side, and hence in the wavelength conversion of semiconductor laser light in the near infrared wavelength region, the fundamental wave and generated second order harmonics are absorbed; thus the desired second order harmonics cannot be taken out efficiently.

SUMMARY OF THE INVENTION

It is an object of the present invention to provide nonlinear optical material with an increased melting point the compound suppressed in sublimation, and excellent in stability, by dimerizing the portion of a molecule possessing an intra-molecular transfer structure by a straight-chain alkylene group, and further to provide a nonlinear optical material shortened in the adsorption edge by partially severing the conjugate structure of the molecule.

A further object of the invention is to provide a method of manufacturing such nonlinear optical materials facile in crystal growth and capable of obtaining large crystals, and a wavelength converter using the same.

The invention relates to a nonlinear optical material comprising a compound represented by the general formula (1).

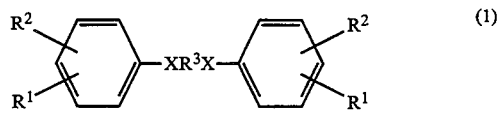

(1)

wherein $R^1$ denotes an electron attractive group, $R^2$ denotes a group selected from the group consisting of a hydrogen atom, methyl group, methoxy group and electron attractive group, $R^3$ denotes a straight-chain alkylene group, and X denotes an oxygen or sulfur atom.

In the nonlinear optical material of the invention. nitro group, formyl group, and $\beta$-substituent cyano vinyl group are preferable as $R^1$.

In the nonlinear optical material of the invention, a straight-chain alkylene group with 1 to 3 carbon atoms preferable as $R^3$.

The present invention also relates to a method of manufacturing a nonlinear optical material comprising the steps of dissolving a compound represented by the general formula (1) in an organic solvent, and evaporating the solvent while keeping the solvent's temperature constant or lowering its temperature, thereby growing a crystal of the compound represented by the general formula (1).

According to the manufacturing method of non-linear optical material of the invention, acetone, toluene, chloroform or tetrahydrofurane are preferable as the organic solvent.

In the manufacturing method of nonlinear optical material of the invention, the rate of evaporation of the organic solvent is desired to be 100 ml/day or less.

The present invention moreover relates to a wavelength converter which is disposed in an optical resonator of a laser apparatus comprising a semiconductor laser, a solid state laser medium and an optical resonator, or which is disposed in the optical resonator of a laser apparatus comprising a semiconductor laser and an optical resonator, with the nonlinear optical material of the wavelength converter comprising the nonlinear optical material mentioned previously.

The present invention further relates to a wavelength converter of the optical waveguide type of which nonlinear optical material of the waveguide for propagating the fundamental wave is made of the nonlinear optical material mentioned previously.

Figure 1:
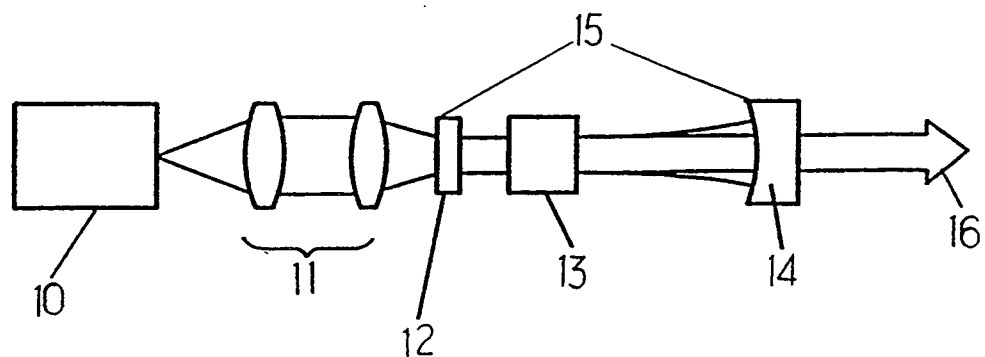
FIG. 1 shows the outline of a laser apparatus using an optical wavelength converter in an embodiment of the invention.

FIG, 3 shows the outline of a laser apparatus using an optical wavelength converter in another embodiment of the invention.

DESCRIPTION OF THE PREFERRED EMBODIMENTS

A nonlinear optical material of the invention comprises a compound represented by the general formula (1).

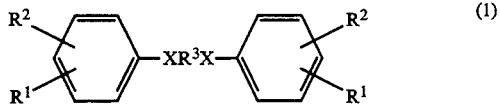

(1)

wherein
$R^1$ denotes an electron attractive group, $R^2$ denotes a group selected from the group consisting of a hydrogen atom, methyl group, methoxy group and electron attractive group, $R^3$ denotes a straight-chain alkylene group, and X denotes an oxygen or sulfur atom.

Examples of an electron attractive group include a nitro group, formyl group, cyano vinyl group, dicyano vinyl group, cyano vinyl acetate group and its alkyl ester derivative substituent (wherein as the alkyl group of the alkyl ester derivative substituent, a straight-chain or branched alkyl group with 1 to 4 carbon atoms is preferable), cyano group, alkoxy carbonyl group such as methyl carbonate and ethyl carbonate, sulfonyl group, isocyanate, anti a halogen atom.

Among those, in particular, a nitro group, formyl group and β-substituent cyano vinyl group are preferable.

As the straight-chain alkylene group represented by $R^3$ in the general formula (1), a straight-chain alkylene group with 1 to 3 carbon atoms is preferred.

The compound represented by the general formula (1) can normally be synthesized, for example, by the following method (the method is a reaction based on a Williamson reaction or Ullmann reaction for reacting dihalogenated alkyl with a phenol derivative in a basic solvent).

A reaction model may be formulated as follows:

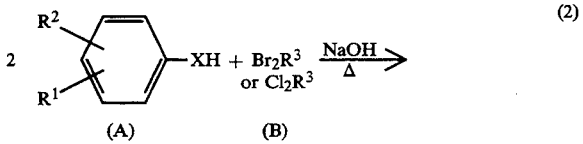

(2)

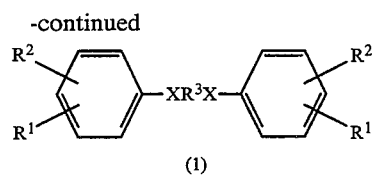

(1)

In the chemical reaction formula (2), $R^1$, $R^2$, $R^3$ and X represent the same groups as $R^1$, $R^2$, $R^3$ and X explained in the general formula (1).

More specifically, in the formula (2), the phenol derivative or thiophenyl derivative represented by the formula (A) is dissolved in an aqueous solution of sodium hydroxide or potassium hydroxide. To this solution, a dihalogenated alkyl represented by the formula (B) is added, and the mixture is refluxed, usually at a temperature of 100° C. or more. In this case, the molar ratio of the phenol derivative or thiophenol derivative represented by the formula (A) and the dihalogenated alkyl represented by the formula (B) is not particularly defined, but is preferred at a ratio of approximately 2:1. After reaction, the reaction solution is allowed to cool to room temperature to precipitate fine crystals. The fine crystals are gathered by filtering, and properly washed in purified water or the like. By recrystallizing these fine crystals using a proper solvent such as acetone, toluene, chloroform or tetrahydrofurane, the compound of the formula (1) is thereby obtained.

It is difficult to directly obtain the compound possessing a β-substituent cyano vinyl group as an electron attractive group by the reaction shown above, and therefore a compound possessing a formyl group introduced as an electron attractive group is preliminarily synthesized by the method shown in the above reaction or the like. This compound possessing the formyl group is then reacted with compounds containing an active methylene group such as malononitrile and methyl cyanoacetate nearly in equivalent amounts in ethanol by adding several drops of piperidine as an alkaline catalyst, thereby transforming the formyl group into a β-substituent cyano vinyl group.

In the reaction formula (2), examples of a phenol derivative or thiophenol derivative represented by the formula (A) include, among others, p-nitrophenol, 2,4-dinitrophenol, phydroxy benzaldehyde, 4-nitro-3-methylphenol, 4-formyl-2-methoxyphenol, and p-nitrothiophenol.

In the reaction formula (2), the alkylene group of dihalogenated alkyl represented by the formula (B) is a straight-chain alkylene group, preferably a straight-chain alkylene group with 1 to 3 carbon atoms.

Practical examples of dihalogenated alkyl include dibromomethane, 1,2-dibromoethane, 1,3-dibromopropane, dichloromethane, 1,2-dichloroethane, and 1,3-dichloropropane.

Preferred examples of the compound represented by the general formula (1) of the invention include, among others, 1,1'-{methylene bis(oxy)}bis{4-nitrobenzene}, 1,1'-{ethylene bis(oxy)}bis{4-nitrobenzene}, 1,1'-{methylene bis(oxy)}bis{4-nitro-3-methylbenzene}, 1,1'-{ethylene bis (oxy)}bis{2,4-dinitrobenzene), 1,1'-{propylene bis(thio)}bis{4-nitrobenzene ), 1,1'-{ethylene bis(thio)}bis{4-nitrobenzene}, 1,1'-{methylene bis(thio)}bis{4-nitrobenzene}, 1,1'-{propylene bis(oxy)}bis{2-methoxy-4-benzaldehyde}, 1,1'-{methylene bis(oxy)}bis{4-benzaldehyde}, 1.1'-{ethylene bis(oxy)} bis{4-benzaldehyde}, 1,1'-{ethylene bis(oxy)}bis{4-(ethyl α-cyanocinnamate)}, 1,1'-{ethylene bis(oxy)}bis{4-(methyl α-cyanocinnamate)}, 1,1'-{ethylene bis(oxy)}bis{4-α-cyanocinnamic acid}, 1,1'-{methylene bis(oxy)}bis{4-(methyl α-cyanocinnamate)}, 1,1'-{methylene bis(oxy)}bis{4-benzyldene malononitrile}, and 1,1'-{methylene bis(oxy)}bis{4-(ethyl α-cyanocinnamate)}.

Among them, 1,1'-{methylene bis(oxy)}bis{4-nitrobenzene}, 1,1'-{propylene bis(thio)}bis{4-nitrobenzene}, 1,1'-{methylene bis(oxy)}bis{4-benzaldehyde}, 1,1'-{ethylene his(oxy)}bis{4-benzaldehyde}, and 1,1'-{methylene bis(oxy)}bis{4-(methyl α-cyanocinnamate)} are particularly preferable.

To obtain larger crystals from the fine crystals of the nonlinear optical material of the invention, it is preferable to dissolve a compound represented by the formula (1) in an organic solvent and evaporate the solvent while keeping the solvent's temperature constant or lowering its temperature.

Examples of organic solvents for crystal growth may include aromatic hydrocarbons such as benzene, toluene and xylene, ethers such as tetrahydrofurane, ketones such as acetone and methylethyl ketone, and ethyl acetate, chloroform, acetonitrile and mixed solvents containing them. Preferred solvents are acetone, toluene, chloroform, and tetrahydrofurane.

The slower the rate of evaporation of the solvent, the larger the single crystals obtained; and, for example, the rate of evaporation of the solvent is preferred to be 100 ml/day or less per 200 ml of solution.

More specifically fine crystals of the compound represented by the formula (1) are dissolved in a proper solvent as mentioned above at about the saturated concentration of the compound and the solvent is evaporated slowly over several days. The solvent is evaporated by adjusting the rate of evaporation—preferably 100 ml/day or lss. Thus, larger single crystals are obtainable.

The nonlinear optical material made of the compound represented by the formula (1) possesses a strong electron attractive group in the aromatic ring, and is hence large in the deviation of electron density distribution. In the case of the compound possessing the β-substituent cyano vinyl group, the conjugate length for allowing π-electron movement is longer, and therefore the compound has a molecular structure showing second order hyperpolarizability for demonstrating a greater nonlinear optical effect.

In addition, in the compound represented by the formula (1), since the $-XR^3$ position bonded to the aromatic ring acts as a weak electron donative group, the adsorption edge is shorter in wavelength as compared with that of nitroaniline derivatives.

For example, in calculation of the second order hyperpolarizability β, when calculated by the AM1 method (Austin Model 1), a method of molecular orbital calculation, in the compound represented by the formula (1), if $R^1$ is β, β-dicyano vinyl group, $R^2$ is a hydrogen atom, and X is an oxygen atom, the second order hyperpolarizability β of (p-dicyano vinyl)anisole, which is a similar compound having the position contributing to the nonlinear optical effect, is 10.3. Thus the value is a superior value as compared with 6.0 of p-nitroaniline or 9.2 of 4-(N,N-dimethyl) nitroaniline, standard nonlinear optical materials.

Moreover, in the adsorption wavelength, the molecular structure of the nonlinear optical material of the present invention has a weak electron donative group and a strong electron attractive group, and therefore the adsorption edge is shifted to the shorter wavelength side by more than 50 nm as compared with the above ordinary compounds, and thus it is also preferably applicable to the wavelength converting material using semiconductor lasers.

Furthermore, since the portions contributing to the nonlinear optical effect are linked, namely dimerized, by the straight-chain alkylene group, the melting point may be increased, and sublimation may be restrained. For example, the melting point of p-nitroanisole is 54° C., but the melting point of 1,1'-{methylene bis(oxy)} bis{4-nitrobenzene}, which corresponds to the dimerized compound of p-nitroanisole by the methyl group, is 148° C., and it is recognized that the stability of the compound is thus enhanced.

In the compound represented by the formula (1), the structure comprising the alkylene position and the phenoxy parts at both sides may easily be formed into a structure possessing only the rotation axis and not possessing a symmetry axis of rotary reflection in the shape of the entire molecule, and therefore it is likely to become a chiral compound. That is, the compound disclosed in the formula (1) is a compound likely to possess the molecular skeleton expressed by point group $C_n$ or $D_n$.

Moreover, the single crystal compound obtained in the invention is likely to possess a structure without a center of symmetry on the crystal structure; that is, a structure stacking the molecules in the same direction, or a structure possessing a rotation axis or spiral axis. And in latter case, the dipole moment of the entire crystal disappears, but only the nonlinear optical constant of the third order tensor is present, and therefore nonlinear optical characteristics are easily demonstrated also in the crystal state. Yet, because of the structure not possessing a hydrophilic substituent, the solubility is low in water and in a solvent possessing a hydrophilic substituent such as a hydroxyl group. Crystallization from such a solvent is difficult, and single crystals may easily be obtained by using the solvents as shown in the examples of the invention. Moreover, though details are unknown, through the mutual action of the solvent molecule and dissolved compound, there is a crystal morphology problem of changing the packing state in the process of crystallization; but in the combination of the solvent used in the invention and the compound disclosed in the formula (1), large crystals may be grown while forming a crystal structure free from a center of symmetry at high probability.

Furthermore, when the evaporation rate of the solvent is high, the difference in the crystal growth velocity of each crystal axis in the crystal structure has a great influence, and it is difficult to obtain large single crystals. However, by controlling the rate of evaporation of the solvent at 100 ml/day or less, the crystal growth velocity can be managed.

Applicable examples of nonlinear optical material of the invention may be effectively used as the nonlinear optical material of an optical wavelength converter disposed in the optical resonator of the laser apparatus comprising a semiconductor laser, solid state laser medium and optical resonator, or the semiconductor laser and optical resonator.

Furthermore, the nonlinear optical material of the invention may also be used effectively as the nonlinear optical material used in the waveguide of a wavelength converter of the optical waveguide type.

In the invention of the wavelength converter disposed in the optical resonator, by using the nonlinear optical material of the invention as the nonlinear optical material of the wavelength converter, a wavelength converter capable of obtaining a large output of second harmonics excellent in wavelength conversion efficiency may be obtained.

In addition, in the invention of the wavelength converter of the optical waveguide type mentioned above, by using the nonlinear optical material of the invention as the nonlinear optical material of the waveguide for propagating the fundamental wave, it is possible to provide an excellent optical wavelength converter possessing characteristics of wavelength conversion efficiency not depending so much on the temperature, and capable of modulating the output of the second harmonics directly, without using an external optical modulator when modulating the light of a semiconductor laser.

The structures of these laser apparatuses and wavelength converters of the optical waveguide type are known, and, in the invention, as the nonlinear optical material used in such devices, the nonlinear optical material composed of the compound represented by the formula (1) is used.

In fabrication of the wavelength converter used in these devices, the crystal of the compound represented by the formula (1) is grown by the method of the invention mentioned above, and obtained single crystals are cut out in the phase matching direction. Then, to prevent scattering or reflection of light, the cut crystals are polished or coated if necessary. The coating is not particularly defined, but, for example, as the ordinary light scattering- and reflection-preventive coating, dielectric multilayers such as $SiO_2$, $TiO_2$ and $MgF_2$ may be coated by the vacuum evaporation method or the like. Instead of a coating process, a nonreflective coated optical glass may be adhered through a matching solution or resin so that the fundamental wave and higher harmonics may pass through easily. The matching solution and resin may be selected from materials of which the reflective index is close to the nonlinear optical material to be used; for example, 1-bromo naphthalane is used as the matching solution, and epoxy resin and the like may be used as the resin. By inserting this element into the optical resonator, optical higher harmonics may be efficiently obtained.

In the wavelength converter of the optical waveguide type, the nonlinear optical material is crystallized in the core of a capillary hollow tube made of optical glass or transparent resin, and the single crystal region is judged by a microscope or the like. In the judged single crystal region, a capillary of a required length may be cut out to be employed as the device. The size of the capillary hollow tube is not particularly defined, but a tube of, for example, about 1 to 20 μm in inside diameter, 0.1 to 1 mm in outside diameter, and 10 to 50 mm in length may be used. By emitting the semiconductor laser light into the obtained fiber-type wavelength converter, optical higher harmonics may be obtained efficiently.

As understood from the explanation herein, according to the invention, the adsorption edge of the compound is expected to become shorter by providing the aromatic ring with a weak electron donative portion and a strong electron attractive group, and by further dimerizing it by a straight-chain alkylene group to form a molecular skeleton. Thus a compound high in melting point, suppressed in sublimation, high in stability and excellent in nonlinear optical characteristics may be provided.

The manufacturing method of nonlinear optical material of the invention provides such material having excellent nonlinear optical characteristics and having a shortened adsorption edge as readily as large single crystals.

The wavelength converter of the invention disposed in the optical resonator is excellent in optical wavelength conversion efficiency, and an optical wavelength converter relatively great in the output of second harmonics can be provided.

In the wavelength converter of the optical waveguide type, of which wavelength conversion efficiency does not depend so much on temperature, it is possible to provide an excellent wavelength converter capable of modulating the second harmonics directly without using an external optical modulator when modulating the light of a semiconductor laser.

The invention is further described below by referring to examples, but it must be noted that the invention is not limited to these examples alone.

EXAMPLE 1

In a 200 ml three neck flask, 10 g (0.072 mol) of pnitrophenol (Tokyo Kasei Kogyo Co., Ltd.) was deposited, and dissolved while stirring in 50 ml of an aqueous solution containing 3.17 g (0.079 mol) of sodium hydroxide. To this solution, 6.88 g (0.040 mol) of dibromomethane was added, and refluxed at 120° C. in an oil bath. After reflux for one day, the reaction was terminated, and the solution was allowed to cool to room temperature. At this time, white fine crystals precipitated and were filtered and washed in purified water. The crystals were recrystallized in acetone. The fine crystals were identified by the nuclear magnetic resonance (NMR) method and field-desorption mass spectrometry (FD-MS) method, and were confirmed to be 1,1'-{methylene bis(oxy)}bis{4-nitrobenzene}. The melting point of the crystals was 148° C., and the results of NF[R measurement were $\delta=8.24$ to $7.21$; 8H, $\delta=5.90$; 2H.

The structure of this compound is shown in chemical formula (3).

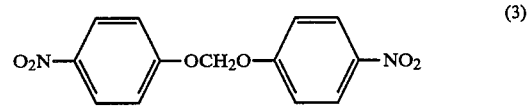

(3)

EXAMPLE 2

In a 200 ml three neck flask, 10 g (0.072 mol) of pnitrophenol (Tokyo Kasei Kogyo Co., Ltd.) was deposited, and dissolved while stirring in 50 ml of an aqueous solution containing 3.17 g (0.079 mol) of sodium hydroxide. To this solution, 7.51 g (0.040 mol) of 1,1-dibromoethane was added, and refluxed at 120° C. in an oil bath. After reflux for one day, the reaction was terminated and the solution was allowed to cool to room temperature. At this time, white fine crystals precipitated and were filtered and washed in purified water. The fine crystals were recrystallized in acetone. The crystals were identified by the same methods as in Example 1, and were confirmed to be 1,1'-{ethylene bis(oxy)}bis{4-nitrobenzene}. The melting point of the crystals was 127.1° C., and the results of NMR measurement were δ=7.139 to 8.311; 8H, δ=4.551; 4H.

The structure of this compound is shown in the chemical formula (4).

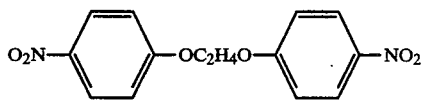

(4)

EXAMPLE 3

In a 200 ml three neck flask, 10 g (0.065 tool) of 4-nitro-3-methylphenol (Tokyo Kasei Kogyo Co., Ltd.) was deposited, and dissolved while stirring in 50 ml of an aqueous solution containing 2.88 g (0.072 mol) of sodium hydroxide. To this solution, 6.25 g (0.036 mol) of dibromomethane was added, and refluxed at 120° C. for one day in an oil bath. After termination of the reaction, the solution was allowed to cool to room temperature, and a pale yellow precipitate was obtained. The precipitate was washed in purified water, and recrystallized in acetone. By the same analysis for identification as in Example 1, the obtained yellowish white crystal was confirmed to be 1,1'-{methylene bis(oxy)} bis{4-nitro-3-methylbenzene). The melting point of the crystal was 106° C.

The structure of this compound is shown in the chemical formula (5).

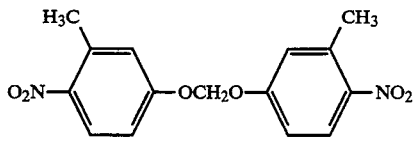

(5)

EXAMPLE 4

In a 200 ml three neck flask, 10.01 g (0.054 mol) of 2,4-dinitrophenol (Tokyo Kasei Kogyo Co., Ltd.) was deposited, and dissolved while stirring in 50 ml of an aqueous solution containing 2.41 g (0.060 mol) of sodium hydroxide. To this solution, 5.66 g (0.03 mol) of 1,1-dibromoethane was added, arid refluxed at 120° C. for one day in an oil bath. After termination of the reaction, the solution was allowed to cool to room temperature, and a yellowish orange precipitate was obtained. The precipitate was washed in purified water, and recrystallized in tetrahydrofurane. By the same analysis for identification as in Example 1, the obtained pale yellow fine crystal was confirmed to be 1,1'-{ethylene bis(oxy)}bis{2,4-nitrobenzene}. The melting point of the crystal was 85.2° C. The structure of this compound is shown in the chemical formula (6).

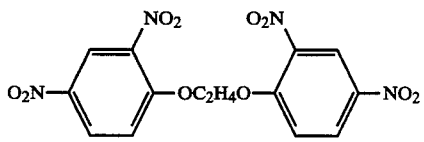

(6)

EXAMPLE 5

In a 200 ml three neck flask, 10 g (0.064 mol) of p-nitrothiophenol (Tokyo Kasei Kogyo Co., Ltd.) was deposited, and dissolved while stirring in 50 ml of an aqueous solution containing 2.84 g (0.071 mol) of sodium hydroxide. To this solution, 7.16 g (0.035 mol) of 1,3-dibromopropane was added, and refluxed at 120° C. for one day in an oil bath. After termination of the reaction, the solution was allowed to cool to room temperature, and a brown precipitate was obtained. The precipitate was filtered and washed in purified water, and recrystallized in chloroform. By the same analysis for identification as in Example 1, the obtained yellow-green fine crystal was confirmed to be 1,1'-{propylene bis(thio)}bis{4-nitrobenzene}. The melting point of the crystal was 93.8° C.

The structure of this compound is shown in the chemical formula (7).

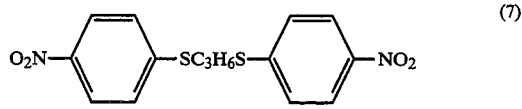

(7)

EXAMPLE 6

In a 200 ml three neck flask, 10 g (0.064 mol) of p-nitrothiophenol (Tokyo Kasei Kogyo Co., Ltd.) was deposited, and dissolved while stirring in 50 ml of an aqueous solution containing 2.84 g (0.071 mol) of sodium hydroxide. To this solution, 6.58 g (0.035 mol) of 1,1-dibromoethane was added, and refluxed at 120° C. for one day in an oil bath. After termination of the reaction, the solution was allowed to cool to room temperature, and a yellow-orange precipitate was obtained. The precipitate was filtered and washed in purified for identification as in Example 1, the obtained yellow fine crystal was confirmed to be 1,1'-{ethylene bis(thio)} bis{4 -nitrobenzene}. The melting point of the crystal was 110.2° C.

The structure of this compound is shown in the chemical formula (8).

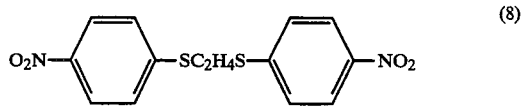

(8)

EXAMPLE 7

In a 200 ml three neck flask, 10 g (0.064 mol) of p-nitrothiophenol (Tokyo Kasei Kogyo Co., Ltd.) was deposited, and dissolved while stirring in 50 ml of an aqueous solution containing 2.84 g (0.071 mol) of sodium hydroxide. To this solution, 6.08 g (0.035 mol) of dibromomethane was added, and refluxed at 120° C. for one day in an oil bath. After termination of the reaction, the solution was allowed to cool to room temperature, and a yellow precipitate was obtained. The precipitate was filtered and washed in purified water, and recrystallized in chloroform. By the same analysis for identification as in Example 1, the obtained pale yellow fine crystal was confirmed to be 1,1'-{methylene bis(thio)} bis{4-nitrobenzene}. The melting point of the crystal was 140.1° C.

The structure of this compound is shown in the chemical formula (9).

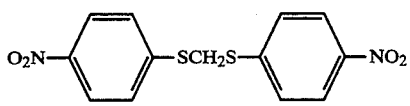
(9)

EXAMPLE 8

In a 200 ml three neck flask, 10.02 g (0.066 mol) of vanillin or 4-formyl-2-methoxyphenol (Kanto Chemical Co., Inc.) was deposited, and dissolved while stirring in 50 ml of aqueous solution containing 2.94 g (0.074 mol) of sodium hydroxide. To this solution, 7.36 g (0.036 mol) of 1,3-dibromopropane was added, and refluxed at 120° C. for one day in an oil bath. After termination of the reaction, the solution was allowed to cool to room temperature, and a milky white precipitate was obtained. The precipitate was washed in purified water, and recrystallized in acetone. By the same analysis for identification as in Example 1, the obtained fine crystal was confirmed to be 1,1'-{propylene bis(oxy)}bis{2-methoxy-4-benzaldehyde). The melting point of the crystal was 115.9° C.

The structure of this compound is shown in the chemical formula (10).

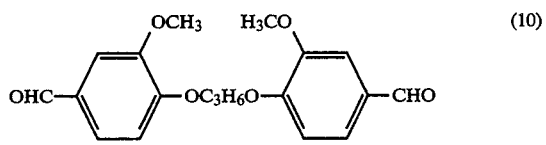
(10)

EXAMPLE 9

In a 200 ml three neck flask, 10 g (0.082 mol) of p-hydroxy benzaldehyde (Tokyo Kasei Kogyo Co., Ltd.) was deposited, and dissolved while stirring in 50 ml of an aqueous solution containing 3.61 g (0.090 mol) of sodium hydroxide. To this solution, 7.83 g (0.045 mol) of dibromomethane was added, and refluxed at 120° C. for one day in an oil bath. After termination of the reaction, the solution was allowed to cool to room temperature, and a milky white precipitate was obtained. The precipitate was washed in purified water, and recrystallized in acetone. By the same analysis for identification as in Example 1, the obtained white fine crystal was confirmed to be 1,1'-(methylene bis(oxy))bis{4-benzaldehyde). The melting point of the crystal was 77.2° C.

The structure of this compound is shown in the chemical formula (11).

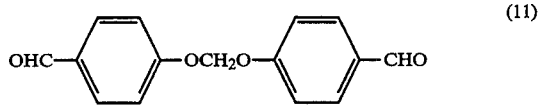
(11)

EXAMPLE 10

In a 100 ml three neck flask, 10 g (0.082 mol) of phydroxy benzaldehyde was deposited, and dissolved while stirring in 50 ml of an aqueous solution containing 3.61 g (0.090 mol) of sodium hydroxide. To this solution, 8.46 g (0.045 mol) of 1,1-dibromoethane was added, and refluxed at 120° C. for one day in an oil bath. After termination of the reaction, the solution was allowed to cool to room temperature, and a pale yellow precipitate was obtained. The precipitate was washed in purified water, and recrystallized in acetone, and a pale yellow crystal was obtained. By the same analysis for identification as in Example 1, the obtained pale yellow fine crystal was confirmed to be 1,1'-{ethylene bis(oxy)}-bis{4-benzaldehyde}. The melting point of the crystal was 81.5° C., and the results of NMR measurement were $\delta=9.912$; 2H, $\delta=7.94$ to 6.99; 8H, $\delta=4.54$; 4H.

The structure of this compound is shown in the chemical formula (12).

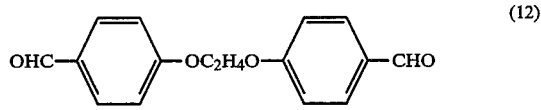
(12)

To manufacture a compound in which a β-substituent cyano vinyl group is introduced, 10 g (0.0370 mol) of 1,1'-{ethylene bis(oxy)}bis{4-benzaldehyde) was then dissolved while stirring in 10 g of ethanol, and 9.21 g (0.082 mol) of ethyl cyanoacetate was added together with several drops of piperidine, and reacted by heating at 70° C. while stirring for 30 minutes. After reaction, the solution was allowed to cool to room temperature, and was cooled in a refrigerator for recrystallization. Pale yellow fine crystals were obtained of 1,1'-{ethylene bis(oxy)}bis{4-(ethyl α-cyanocinnamate)}, which was the compound that the formyl group replaced by the cyano acrylic ester group. By the same analysis for identification as in Example 1, the obtained pale yellow fine crystal was confirmed to be 1,1'-{ethylene bis(oxy)}bis{4-(ethyl α-cyanocinnamate)}. The melting point of the crystal was 175.8° C., and the results of NMR measurement were $\delta=8.184$; 2H, $8=8.10$ to 6.97; 8H, $\delta=4.44$; 4H, $\delta=4.55$ to 4.20; 4H, and $\delta=1.58$ to 1.27; 6H.

The structure of this compound is shown in the chemical formula (13).

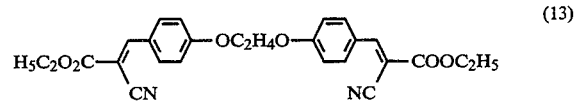
(13)

EXAMPLE 11

Conforming to Example 10, 1,1'-{ethylene bis(oxy)} bis{4-benzaldehyde) was synthesized, and 10 g (0.037 mol) of the compound was dissolved while stirring in ethanol, and 8.07 g (0.082 mol) of methyl cyanoacetate was added together with several drops of piperidine, and reacted by heating at 70° C. while stirring for 30 minutes. After reaction, the solution was allowed to cool to room temperature, and was cooled in a refrigerator for recrystallization. White fine crystals of 1,1'-{ethylene bis(oxy)}bis{4-(methyl α-cyanocinnamate)} were then obtained. By the same analysis for identification as in Example 1, the obtained white fine crystal was confirmed to be 1,1'-{ethylene bis(oxy)}bis(4-(methyl α-cyanocinnamate)}. The melting point of the crystal was 161.6° C.

The structure of this compound is shown in the chemical formula (14).

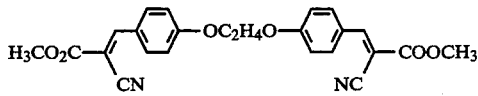

(14)

EXAMPLE 12

Conforming to Example 10, 1,1'-{ethylene bis(oxy)}bis{4-benzaldehyde) was synthesized, and 2.5 g (0.009 mol) of the compound was dissolved while stirring in a mixed solution of 8 g of pyridine and 2 g of methanol, and 1.62 g (0.019 mol) of cyanoacetic acid was added together with several drops of piperidine, and reacted by heating at 70° C. while stirring for 30 minutes. After reaction, the solution was allowed to cool to room temperature and the solution was neutralized with hydrochloric acid while diluting in purified water. After being filtered and washed in purified water, pale yellow fine crystals of 1,1'-(ethylene bis(oxy)}bis(4- α-cyanocinnamic acid} were then obtained. By the same analysis for identification as in Example 1, the obtained pale yellow fine crystal was confirmed to be 1,1'-{ethylene bis(oxy)}bis {4- α-cyanocinnamic acid}. This crystal sublimated from 191° C., and its decomposition point was 210.5° C.

The structure of this compound is shown in the chemical formula (15).

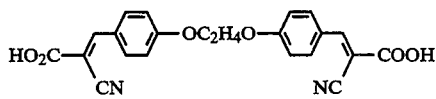

(15)

EXAMPLE 13

Conforming to Example 10, 1,1'-{methylene bis(oxy)}bis{4-benzaldehyde} was synthesized, and 10 g (0.39 mol) of the compound was dissolved while stirring in 10 g of ethanol, and 8.51 g (0.086 mol) of methyl cyanoacetate was added together with several drops of piperidine, and reacted by heating at 70° C. while stirring for 30 minutes. After reaction, the solution was allowed to cool to room temperature and was neutralized with hydrochloric acid while diluting in purified water. After being filtered and washed in purified water, pale yellow fine crystals of 1,1'-{methylene bis(oxy)}bis{4-(methyl α-cyanocinnamate)} were then obtained. By the same analysis for identification as in Example 1, the obtained pale yellow fine crystal was confirmed to be 1,1'-{methylene bis(oxy)}bis{4-(methyl α-cyanocinnamate)}. The melting point of the crystal was 153.5° C.

The structure of this compound is shown in the chemical formula (16).

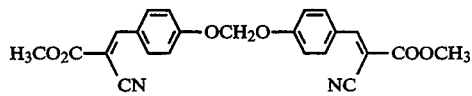

(16)

EXAMPLE 14

Conforming to Example 10, 1,1'-{methylene bis(oxy)}bis{4-benzaldehyde} was synthesized, and 10 g (0.39 mol) of the compound was dissolved while stirring in 10 g of ethanol, and 5.68 g (0.086 mol) of malononitrile was added together with several drops of piperidine, and reacted by heating at 70° C. while stirring for 30 minutes. After reaction, the solution was allowed to cool to room temperature and the solution was neutralized with hydrochloric acid while diluting in purified water. After being filtered and washed in purified water, pale yellow fine crystals of 1,1'-{methylene bis(oxy)}bis{4-benzylidene malononitrile} were then obtained. By the same analysis for identification as in Example 1, the obtained pale yellow fine crystal was confirmed to be 1,1'-{methylene bis(oxy)}bis{4-benzylidene malononitrile}. The melting point of this crystal was 162.9° C.

The structure of this compound is shown in the chemical formula (17).

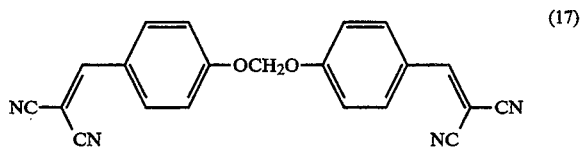

(17)

EXAMPLE 15

Conforming to Example 10, 1,1'-{methylene bis(oxy)}bis{4-benzaldehyde} was synthesized, and 10 g (0.039 mol) of the compound was dissolved while stirring in 10 g of ethanol, and 9.72 g (0.086 mol) of ethyl cyanoacetate was added together with several drops of piperidine, and reacted by heating at 70° C. while stirring for 30 minutes. After reaction, the solution was allowed to cool to room temperature and was neutralized with hydrochloric acid while diluted in purified water. After being filtered and washed in purified water, pale yellow fine crystals of 1,1'-{methylene bis(oxy)}bis{4-(ethyl α-cyanocinnamate)} were then obtained. By the same analysis for identification as in Example 1, the obtained pale yellow fine crystal was confirmed to be 1,1'-{methylene bis(oxy)}bis{4-(ethyl α-cyanocinnamate)}. The melting point of the crystal was 127.5° C.

The structure of this compound is shown in the chemical formula (18).

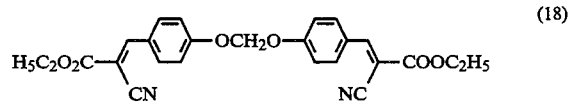

(18)

The second harmonic generation (SHG) intensity of the compounds in the chemical formulas (3) to (18) were measured by Kurtz's powder method (S. K. Kurtz, J. App. Phys., 39, 3798, 1968). The results are summarized in Table 1.

TABLE 1

| Compound (Formula No.) | SHG intensity (ratio to urea) | Compound (Formula No.) | SHG intensity (ratio to urea) |
| --- | --- | --- | --- |
| 3 | 10.0 | 11 | 5.0 |
| 4 | 8.0 | 12 | 2.0 |
| 5 | 5.0 | 13 | 2.5 |
| 6 | 3.0 | 14 | 0.5 |
| 7 | 5.0 | 15 | 1.0 |
| 8 | 0.5 | 16 | 4.0 |
| 9 | 0.3 | 17 | 3.0 |
| 10 | 3.0 | 18 | 3.0 |

EXAMPLE 16

About 20 g of the fine crystals of 1,1'-{methylene bis(oxy)}bis{4-nitrobenzene} obtained in Example 1 were dissolved while heating in 100 ml of acetone in a 200 ml beaker.

A tiny hole was opened in a paraffin film ("TS-film"; TOYOBO Engineering Co., Ltd.), and the beaker containing the solution was covered with the film, and stored in a thermostatic chamber at 25° C. Three days later, when the solution was about half its original volume, a single crystal of 1,1'-{methylene bis(oxy)}bis{4-nitrobenzene) of about 1 mm × 1 mm × 3 mm was obtained. Several days later, when the solution was completely dried up, a single crystal of 1,1'-{methylene bis(oxy)}bis(4-nitrogenzene) of 3 mm × 3.5 mm × 3 mm was found at the bottom of the beaker. The adsorption edge wavelength of this crystal was about 430 nm as a result of measurement by transmission method using a spectrometer; this was about 80 run shorter than the adsorption edge wavelength of 2-methyl-4-nitroaniline (abbreviation:MNA), a typical organic nonlinear optical material. The Vickers hardness of the crystal was about 10, as compared with the hardness 9 of a urea single crystal, and the former was also found to be sufficiently superior in workability.

When this crystal was irradiated with pulse laser light of a Q switch YAG laser as a fundamental wave, a phase-matched green light of 532 nm wavelength was observed. And when irradiated with a dye laser of 946 nm wavelength as the fundamental wave, a phase-matched blue light at a wavelength of 473 nm was also observed.

EXAMPLE 17

About 20 g of the fine crystals of 1,1'-{methylene bis(oxy)}bis{4-nitro-3-methylbenzene) obtained in Example 3 was dissolved while heating in 100 ml of tetrahydrofurane in a 200 ml beaker. A tiny hole was opened in a paraffin film, and the beaker containing the solution was covered with the film, and stored in a thermostatic chamber at 25° C. Three days later, when the solution was about half its original volume, a single crystal of 1,1'-{methylene bis(oxy)}bis{4-nitro-3-methylbenzene} of about 1 mm × 1 mm × 1 mm was obtained. Several days later, when the solution was completely dried up, a single crystal of 1,1'-{methylene bis(oxy)}bis{4-nitro-3-methylbenzene) of 2 mm × 3.5 mm × 3 mm was found at the bottom of the beaker. The adsorption edge wavelength of the crystal was about 440 nm as a result of measurement by a transmission method using a spectrometer; this was about 70 nm shorter than the adsorption edge wavelength of MNA, a typical organic nonlinear optical material.

EXAMPLE 18

About 20 g of the fine crystals of 1,1'-{ethylene bis(oxy)}bis{4-benzaldehyde) obtained in Example 10 was dissolved while heating in 100 ml of toluene in a 200 ml beaker. A tiny hole was opened in a paraffin film, and the beaker containing the solution was covered with the film and stored in a thermostatic chamber at 25° C. Three days later, when the solution was about half its original volume, a single crystal of 1,1'-(ethylene bis(oxy)}bis(4-benzaldehyde) of about 1 mm × 1 mm × 2 sun was obtained. Several days later, when the solution was completely dried up, a single crystal of 1,1'-{ethylene bis(oxy)}bis{4-benzaldehyde} of 2 mm × 3.5 mm × 5 mm was found at the bottom of the beaker. The adsorption edge wavelength of the crystal was about 380 mn as a result of measurement by a transmission method using a spectrometer; this was about 130 nm shorter than the adsorption edge wavelength of MNA, a typical organic nonlinear optical material. Changes of crystal forms of the compounds in Examples 16 to 18 in various solvents are recorded in Table 2.

TABLE 2

| Solvent (dipole moment) | Compound | | |
|---|---|---|---|
| | Example 16 | Example 17 | Example 18 |
| Toluene (0.37D) | Thick plate | Plate | Plate |
| Chloroform (1.15D) | Needle | Plate | Plate |
| Methanol (1.664D) | Needle | — | Needle |
| Ethanol (1.68D) | Needle | Needle | Needle |
| Tetrahydrofuran (1.70D) | Needle | Thick plate | Needle |
| Ethyl acetate (1.88D) | Needle | — | Plate |
| Acetone (2.69D) | Thick plate | Needle | Thick plate |
| Acetonitrile (3.44D) | Powder | Thick plate | Powder |

EXAMPLE 19

Referring now to FIG. 1, the wavelength converter of the invention is described below.

In FIG. 1, numeral 10 denotes a semiconductor laser, 11 is a lens system, 12 is a Nd:YAG crystal, 13 is an optical wavelength converter, 14 is a mirror (in this example, a concave mirror), 15 is an optical resonator, and 16 refers to second harmonics. This embodiment relates to a laser apparatus in a constitution whereby optical wavelength converter 13 is inserted in the optical resonator 15. The optical wavelength converter 13 was fabricated by adhering nonreflective coated optical glass—for ease of transmission of light in the wavelength of 1064 nm and 532 nm through matching oil (in this case, 1-bromonaphthalene) or resin (for example, epoxy resin)—to both surfaces of a nonlinear optical material comprised of the single crystal of the compound manufactured according to Example 1. The surface of mirror 14 has a dielectric multilayer (for example, MgF₂ film) which reflects the light in the wavelength of 1064 nm oscillated by pumping of the Nd:YAG crystal 12, but passes light in the wavelength of 532 nm produced as a result of wavelength conversion by optical wavelength converter 13. At one end of Nd:YAG crystal 12 (the lens system 11 side), there is also a dielectric multilayer which passes light in the wavelength of 808 nm oscillated from the semiconductor laser 10, but reflects light in the wavelength of 1064 nm and light in the wavelength of 532 nm of the second harmonics.

Using the semiconductor laser 10 (wavelength 808 nm, output 1 W), Nd:YAG crystal 12 is pumped and laser light in the wavelength of 1064 nm is oscillated. In this case, the optical resonator 15 is composed between the end of Nd:YAG crystal 12 and the mirror 14 surface. Wavelength converter 13 is inserted in optical resonator 15. As mentioned above, the laser light in the wavelength of 808 nm oscillated by the semiconductor laser 10 is condensed by the lens system 11, and enters Nd:YAG crystal 12 to excite that crystal, and oscillates laser light in the wavelength of 1064 nm. This light passes through wavelength converter 13 and is partially converted in wavelength, thereby generating second harmonics in 532 nm. The laser light reaches mirror 14, and laser light in 1064 nm not converted in wavelength is reflected by the surface of mirror 14, and passes through wavelength converter 13, and is reflected by tile end of Nd:YAG crystal 12, and passes again through the wavelength converter 23 to be converted in wavelength. Then, the second harmonics in 532 nm pass through mirror 14 and are sent out as second harmonics 16, while the laser light in the wavelength of 1064 nm not yet converted in wavelength yet is reflected again by mirror 14 and the same process is repeated. After passing through wavelength converter 13 several times, the wavelength converted second harmonics in 532 nm are sent out as second harmonics 16.

In this embodiment since wavelength converter 13 is inserted in optical resonator 25, and the fundamental wave has a very strong electric field strength, a high conversion efficiency is expected. Actually, using wavelength converter 13 composed of the nonlinear optical material (thickness 1 to 5 nm), made of the single crystal of the compound shown in Example 1 with the surface treated by nonreflective coating, an output of second harmonics in a green color at a maximum of 3 mW was obtained at the power of 1 W of a semiconductor laser. In this case, the compound of a single crystal may be directly treated by nonreflective coating.

EXAMPLE 20

Figure 2:
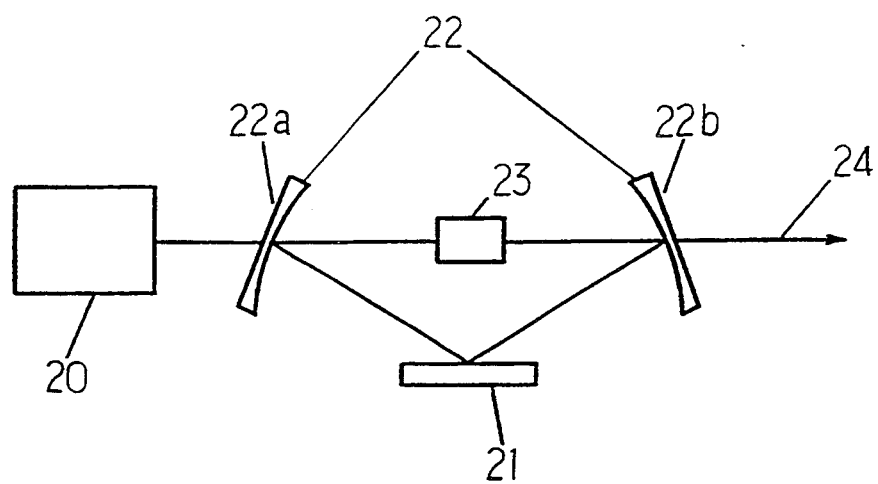
FIG. 2 shows the outline of a laser apparatus using an optical wavelength converter in an other embodiment of the invention.

The wavelength converter of the invention is further described below by reference to FIG. 2. The nonlinear optical material made of a single crystal of the compound in Example 1 confirmed that phase matching was possible at a wavelength of 980 nm by using a pulse dye laser with a wavelength of 980 nm as the fundamental wave. A semiconductor laser 20 using a strained superlattice structure of an InGaAs system in a wavelength of 980 nm was used as the fundamental wave light source. The optical resonator was a ring resonator composed of two concave mirrors 22 (22a, 22b), and one plane mirror 21. The input side mirror 22a and plane mirror 21 are coated with a dielectric multilayer (for example, $MgF_2$ film) for reflecting light in wavelengths of 980 nm and 490 nm. The output side mirror 22b is coated with a dielectric multilayer (for example, $MgF_2$ film) for reflecting light in a wavelength 980 nm and passing light in a wavelength 490 nm.

An optical wavelength converter 23 is prepared by adhering an optical glass plate, with a nonreflective coating for enhancing light transmittance in wavelengths of 980 and 490 nm, to the surface of the crystal for wavelength conversion composed of the nonlinear optical material of the invention through matching oil or resin. When using a resin, for example, an epoxy resin or the like is selected of which the refractive index is close to that of the crystal for the wavelength converter. When the wavelength of semiconductor laser 20—which is the light source—coincides with the resonance wavelength of the ring optical resonator composed of two concave mirrors 22 and one plane mirror 21, the light oscillating from semiconductor laser 20 is trapped within the resonator; therefore the light intensity of the fundamental wave of 980 nm in the resonator increases, and is efficiently converted into second harmonics 24 of 490 nm. In this constitution, an output of second harmonics of 2 mW was obtained at the fundamental wave power of 100 mW.

EXAMPLE 21

Figure 3:
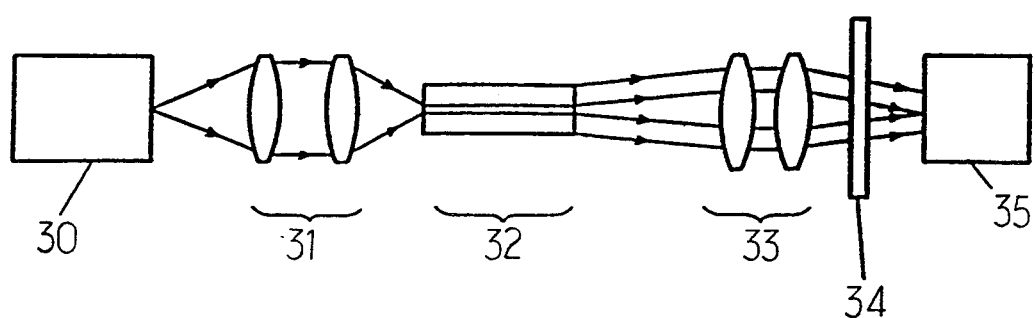

Referring to FIG. 3, the wavelength converter of an optical waveguide type of the invention is explained below.

The compound prepared in Example 1 was dissolved in acetone, and this saturated solution was poured into a hollow glass fiber (inside diameter 1.5 $\mu$m, outside diameter 1 mm, and length 50 mm) by capillary phenomenon, and the fiber was removed from a high temperature side of 30° to 40° C. to a low temperature side of 10° to 15° C. at a rate of 0.5 mm/day to grow crystals. Successively, by using a polarizing microscope to confirm the single crystal region, a wavelength converter of optical waveguide type 32 of a length of 5 mm was produced. The obtained converter was set as shown in FIG. 3, and the wavelength conversion characteristic of the converter were measured. A semiconductor laser 30 of wavelength 980 nm was used as the fundamental wave light source. The light oscillating from semiconductor laser 30 enters wavelength converter 32 through lens system 31. Wavelength converter 32 is an optical waveguide, and the light is propagated as concentrated in an extremely narrow sectional area of the core diameter of the optical waveguide (the same diameter as the inside diameter of the hollow glass fiber, 1.5 $\mu$m in this case). Therefore, the optical power density in the core is extremely high so as to be efficiently converted into second harmonics.

The second harmonics converted in wavelength by wavelength converter 32 are radiated in the so-called Cerenkov-type radiation mode, and converged by a lens system 33, and the light intensity is measured by a photo detector 35. At this time, the unconverted fundamental wave is removed by a fundamental wave cut filter 34. In this system, at the time of a fundamental wave power of 50 mW, the 0.1 mW output of second harmonics is observed by photo detector 35, and the conversion efficiency was 0.2%.

Next, by varying the temperature of wavelength converter 32 from 10° to 40° C., changes of conversion efficiency with temperature variation were measured, and the rate of change of light intensity of second harmonics was confirmed to be small, 10% or less.

The fundamental wave (wavelength 980 nm) was modulated at 500 MHz by modulating the driving current of semiconductor laser 30, and then fed into wavelength converter 32. Second harmonics modulated at 500 MHz in the wavelength of 490 nm were then obtained.

Since the conversion efficiency of such a wavelength converter depends largely on the orientation direction of crystals, inside diameter of the fiber, and refractive index of the fiber (for example, K. Chikuma et al., J. Opt. Soc. Am. B, 7, 768, 1990), a higher conversion efficiency may be expected by optimizing these characteristics. Incidentally, the Cerenkov-type radiation mode device was mentioned above, but the wavelength can be also converted in the method of matching phases among modes.

As the hollow glass fiber used in the embodiment, the size is not limited, and for example, a piece with an inside diameter of 1 to 10 $\mu$m, outside diameter of 0.1 to 2 mm, and length of 10 to 50 mm may be also used. The length of the converter was 5 mm in the embodiment, but it may be in a range of 3 to 20 mm.

In the foregoing embodiments, generation of second harmonics is mentioned, but also in case of sum frequency generation or difference frequency generation, the single crystals of the compound of the invention may be used. Furthermore, instead of the Nd:YAG laser used herein as the solid-state laser, other lasers may be used, such as Nd:YVO$_4$, TiAl$_2$O$_3$, Nd:LiYF$_4$, LiNdP$_4$O$_{12}$, Cr:LiCaAlF$_6$ and Cr:LiSrAlF$_6$.

What is claim is:

1. A wavelength converter which is disposed in an optical resonator of a laser apparatus comprising a semiconductor laser, solid state laser medium and optical resonator, or which is disposed in an optical resonator of a laser apparatus comprising a semiconductor laser and an optical resonator, in which the nonlinear optical material of the wavelength converter comprises a compound represented by the general formula (1)

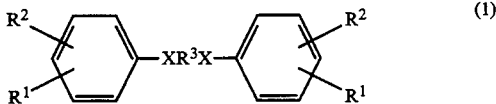

wherein $R^1$ denotes an electron attractive group, $R^2$ denotes a group selected from the group consisting of a hydrogen atom, methyl group, methoxy group and electron attractive group, $R^3$ denotes a straight-chain alkylene group, and X denotes an oxygen or sulfur atom.

2. A wavelength converter of an optical waveguide type of which nonlinear optical material of the waveguide for propagating the fundamental wave comprises a compound represented by the general formula (1)

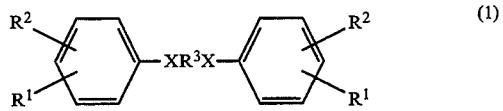

wherein $R^1$ denotes an electron attractive group, $R^2$ denotes a group selected from the group consisting of a hydrogen atom, methyl group, methoxy group and electron attractive group, $R^3$ denotes a straight-chain alkylene group, and X denotes an oxygen or sulfur atom.

3. A method of manufacturing a nonlinear optical material comprising the steps of dissolving a compound represented by the general formula (1) in an organic solvent, and evaporating said solvent while keeping its temperature constant or lowering its temperate, thereby growing a crystal of the compound represented by the general formula (1)

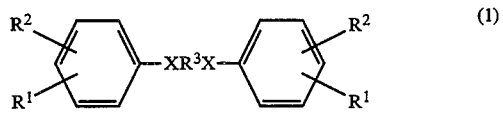

wherein $R^1$ denotes an electron attractive group, $R^2$ denotes a group selected from the group consisting of a hydrogen atom, methyl group, methoxy group and electron attractive group, $R^3$ denotes a straight-chain alkylene group, and X denotes an oxygen or sulfur atom.

4. The method of manufacturing a nonlinear optical material according to claim 3, wherein the organic solvent is at least one organic solvent selected from the group consisting of acetone, toluene, chloroform and tetrahydrofurane.

5. The method of manufacturing a nonlinear optical material according to claim 3, wherein the rate of evaporation of the organic solvent is 100 ml/day or less.

* * * * *

UNITED STATES PATENT AND TRADEMARK OFFICE
CERTIFICATE OF CORRECTION

PATENT NO. : 5,347,394
DATED : September 13, 1994
INVENTOR(S) : Wakita et al.

It is certified that error appears in the above-indentified patent and that said Letters Patent is hereby corrected as shown below:

In column 1, line 27, delete "amine" and insert --amino--.

In column 1, line 43, delete "those" and insert --whose--.

In column 2, line 11, delete "to provide" and insert --to provide a--.

In column 2, line 13, delete "point the compound suppressed" and insert --point of the compound, suppressed--.

In column 5, line 38, delete "lss" and insert --less--.

In column 8, line 44, delete "NF[R" and insert --NMR--.

In column 8, lines 27-28, delete "pnitrophenol" and insert --p-nitrophenol--.

In column 8, lines 56-57, delete "pnitrophenol" and insert --p-nitrophenol--.

In column 9, line 14, delete "tool" and insert --mol--.

In column 9, line 46, delete "arid" and insert --and--.

UNITED STATES PATENT AND TRADEMARK OFFICE
CERTIFICATE OF CORRECTION

PATENT NO. : 5,347,394
DATED : September 13, 1994
INVENTOR(S) : Wakita et al.

It is certified that error appears in the above-indentified patent and that said Letters Patent is hereby corrected as shown below:

In column 10, line 35, delete "purified for" and insert --purified water and recrystallized in chloroform. By the same analysis for--.

In column 11, lines 61-62, delete "phydroxy" and insert --p-hydroxy--.

In column 15, line 20, delete "run" and insert --nm--

In column 15, line 65, delete "sun" and insert --mm--

In column 16, line 2, delete "mn" and insert --nm--.

In column 17, line 5, delete "23" and insert --13--.

In column 17, line 16, delete "25" and insert --15--.

Signed and Sealed this

Twenty-eight Day of February, 1995

Attest:

BRUCE LEHMAN

Attesting Officer         Commissioner of Patents and Trademarks